United States Patent [19]

Wu

[11] Patent Number: 5,278,976
[45] Date of Patent: Jan. 11, 1994

[54] METHOD FOR DETECTING INFINITE LOOPS BY SETTING A FLAG INDICATING EXECUTION OF AN IDLE TASK HAVING LOWER PRIORITY THAN EXECUTING APPLICATION TASKS

[75] Inventor: Solomon Wu, Milpitas, Calif.

[73] Assignee: ROLM Company, Santa Clara, Calif.

[21] Appl. No.: 510,324

[22] Filed: Apr. 16, 1990

[51] Int. Cl.$^5$ .............................................. G06F 11/00
[52] U.S. Cl. ..................... 395/575; 395/375; 371/16.3; 364/264.6; 364/264; 364/264.4; 364/264.5; 364/267.2; 364/267.9; 364/DIG. 1
[58] Field of Search ................ 395/575, 375; 371/16.3

[56] References Cited

U.S. PATENT DOCUMENTS

| | | | |
|---|---|---|---|
| 4,618,953 | 10/1986 | Daniels et al. | 371/12 |
| 4,689,766 | 8/1987 | Kent | 371/16.3 |
| 4,763,296 | 8/1988 | Gercekci | 395/575 |
| 4,803,682 | 2/1989 | Hara et al. | 371/12 |
| 4,809,280 | 2/1989 | Shonaka | 371/62 |
| 4,879,674 | 11/1989 | Yazawa | 371/16.3 |
| 4,956,842 | 9/1990 | Said | 371/62 |
| 4,982,404 | 1/1991 | Hartman | 371/62 |
| 5,073,853 | 12/1991 | Johnson | 395/575 |
| 5,182,755 | 1/1993 | Sekiguchi et al. | 371/16.3 |

Primary Examiner—Thomas C. Lee
Assistant Examiner—Paul Harrity
Attorney, Agent, or Firm—Michael B. Einschlag

[57] ABSTRACT

Method and apparatus for detecting infinite tight loops and infinite inter-task loops in applications tasks in multi-task, real-time systems. In accordance with the inventive method, a low priority task, the idle task, is executed whenever no other task is ready to execute. Further, when the idle task executes it sets a flag. A higher priority, watch dog task executes and tests the flag. If the flag has been set, the watch dog task resets the flag and sends a signal to reset a watch dog timer, however, if the flag has not been set by the idle task for a predetermined time period, the watch dog task will stop resetting the watch dog timer. As a result, this will cause the watch dog timer to trigger and reset the system.

6 Claims, 3 Drawing Sheets

METHOD FOR DETECTING INFINITE LOOPS BY SETTING A FLAG INDICATING EXECUTION OF AN IDLE TASK HAVING LOWER PRIORITY THAN EXECUTING APPLICATION TASKS

TECHNICAL FIELD OF THE INVENTION

The present invention pertains to method and apparatus for detecting loops in real-time systems and, in particular, to method and apparatus for detecting infinite tight loops and infinite inter-task loops in applications tasks in multi-task, real-time systems.

BACKGROUND OF THE INVENTION

As is well known in the art, a watch dog timer is timer circuitry which is designed to reset a real-time system if a predetermined time period ("time-out") has expired prior to the timer's being reset. In a typical real-time system, the function of a watch dog timer is to reset the real-time system whenever a malfunction occurs and, thereby, to prevent the system from crashing. Such malfunctions are typically caused by infinite loops in the operating system.

As is well known, in order to accomplish the above-described objective, a watch dog task in a multi-task, real-time system is assigned the job of "patting" the watch dog timer. The term "patting" the watch dog timer refers to the function of resetting the watch dog timer prior to its reaching the predetermined time-out. As is well known, whenever the watch dog timer is reset, it is, thereby, prevented from resetting the real-time system by, for example, causing a power boot-up. As is also well known, in order to assure that the watch dog task will "pat" the watch dog timer prior to its reaching the predetermined time-out, the watch dog task is typically a relatively high priority task with respect to applications tasks which are also executing in the multi-task, real-time system.

As is well known to those of ordinary skill in the art, infinite loops occur in a typical real-time system. However, certain types of infinite loops are planned and are, therefore, desired whereas other types of infinite loops are unplanned and are, therefore, undesired. For example, an example of a planned infinite loop in a real-time system occurs in response to a real event. Specifically, a real event corresponds to a physical event such as, for example, a timer tick, a disk access and so forth. As a consequence, a real-time system typically contains infinite real event loops which are planned infinite loops. Such infinite loops are usually suspended while they are waiting for a real event to occur.

In contrast to the real event infinite loops described above, there are unplanned infinite loops which are undesirable in a real-time system. One example of such an undesired infinite tight loop is a loop in a real-time task which never terminates and which does not suspend to wait for, for example, a real event. As a consequence, such a task is always ready to execute. Another example of such an undesired infinite loop is an infinite inter-task loop. An infinite inter-task loop is a loop between several tasks which never terminates and which does not suspend to wait for, for example, a real event. Specifically, one example of an infinite inter-task loop is understood in the context of a simple example as follows. Assume that: (a) task A sends a message to task B; (b) task B sends the message to task C; and (c) task C sends the message back to task A. As one can readily appreciate, this cycle will repeat itself forever and will result in one of the tasks, i.e., task A, task B, or task C, always being ready to execute.

Watch dog timers which are used in prior art systems only catch infinite tight loops which occur in the operating system of a multi-task, real-time system. Thus, if the real-time system continues to service interrupts and dispatch tasks, despite the presence of an infinite tight loop in the operating system, the watch dog timer will not be triggered. Further, this will occur, despite the fact that application tasks are looping and, therefore, not providing the intended service. As one can readily appreciate, this is a serious problem in real-time systems where continuous service is important. Further, this is more serious than a problem which results in a crash because most real-time systems are designed to restart automatically after a crash and, as such, service would be resumed.

As one can readily appreciate, there is a need in the art for a method and apparatus for detecting infinite tight loops and infinite inter-task loops in application tasks in a multi-task, real-time system.

SUMMARY OF THE INVENTION

Embodiments of the present invention advantageously satisfy the above-identified need in the art and provide method and apparatus for detecting infinite tight loops and infinite inter-task loops in applications tasks of multi-task, real-time systems. In particular, in accordance with the present invention, a watch dog task and an idle task are utilized to control a watch dog timer so as to detect infinite tight loops and infinite inter-task loops in applications tasks of multi-task, real-time systems. In a preferred embodiment, the idle task is defined to be a task having the lowest priority task in the real-time system and, as a result, the idle task is only scheduled to execute whenever no other task is ready to execute. Further, in a preferred embodiment of the present invention, the idle task executes an infinite loop. Note that when the multi-task, real-time system is operating properly, it will typically not consume 100% of the central processing unit (CPU) for longer than a predetermined time period, which predetermined time period is typically relatively long with respect to the maximum time period that the system can consume 100% of the CPU time in a normally functioning system.

In accordance with the present invention, information, typically in the form of a flag, is passed between the watch dog task and the idle task to indicate that the idle task has executed. For example, whenever the idle task executes, it sets a flag. Further, whenever the watch dog task executes, it examines the flag. If the watch dog task determines that the flag has been set, i.e., to indicate that the idle task has executed, the watch dog task: (a) clears the flag and (b) "pats" the watch dog timer.

As one can readily appreciate, since the idle task can only be executed if no other task is ready to execute, the fact that the flag has been set, i.e., the fact that the idle task has executed, assures that no infinite loop has occurred. However, if the watch dog task determines that the flag has not been set for a predetermined time period N—N being a time period which is longer than the maximum time period that the system can consume 100% of the CPU time in a normally functioning system, then the watch dog task will stop "patting" the watch dog timer and permit the watch dog timer to "time-out" and, thereby, reset the system.

As one can readily appreciate, since the idle task can be executed only if no other task in the system is ready to execute, the fact that the flag is not set, i.e., that the idle task has not executed, assures that an infinite tight loop or an infinite inter-task loop has been detected.

BRIEF DESCRIPTION OF THE DRAWING

A complete understanding of the present invention may be gained by considering the following detailed description in conjunction with the accompanying drawing, in which.

DETAILED DESCRIPTION

Figure 1:
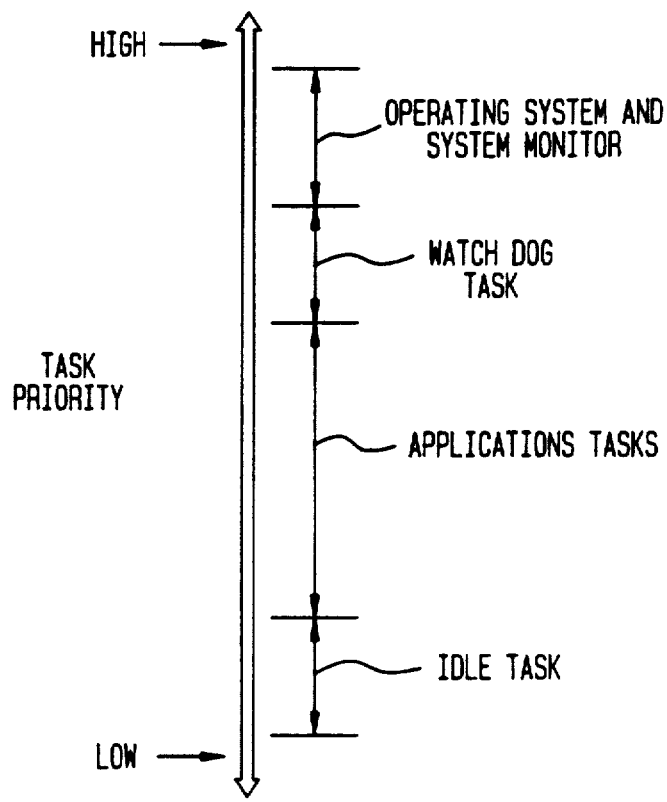
FIG. 1 is a chart which illustrates the priority structure of tasks within a typical multi-task, real-time system.

FIG. 1 is a chart which illustrates the priority structure of tasks within a typical multi-task, real-time system. In accordance with the present invention, tasks are executed by the real-time system, when ready, in accordance with the priority scheme shown in FIG. 1. Specifically, as shown in FIG. 1, the highest priority is assigned to the operating system and the system monitor; the next highest priority is assigned to a watch dog task; the next highest priority is assigned to various applications tasks; and the lowest priority is assigned to an idle task. Since the idle task is the lowest priority task in the multi-task, real-time system, the idle task only executes whenever no other task is ready to run. Further, as will be described in further detail below, the idle task executes in an infinite loop.

A description of the manner in which embodiments of the present invention operate in general is set forth next in order to enable one to better understand the preferred embodiment which is described in detail thereafter.

In general, in accordance with the present invention, a watch dog task and an idle task are utilized to control a watch dog timer. Further, when the multi-task, real-time system is operating properly, it will typically not consume 100% of the central processing unit (CPU) for longer than a predetermined time period, which predetermined time period is typically relatively long with respect to the maximum time period that the system can consume 100% of the CPU time in a normally functioning system.

Specifically, in accordance with the present invention, information, typically in the form of a flag, is passed between between the watch dog task and the idle task to indicate that the idle task has executed. For example, in accordance with the present invention, whenever the idle task executes, it sets a flag. Further, whenever the watch dog task executes, it examines the flag. If the watch dog task determines that the flag has been set, i.e., to indicate that the idle task has executed, the watch dog task: (a) clears the flag and (b) "pats" the watch dog timer.

As one can readily appreciate, since the idle task can only be executed if no other task is ready to execute, the fact that the flag has been set, i.e., the fact that the idle task has executed, assures that no infinite loop has occurred. However, if the watch dog task determines that the flag has not been set for a predetermined time period N—N being a time period which is longer than the maximum time period that the system can consume 100% of the CPU time in a normally functioning system, then the watch dog task will stop "patting" the watch dog timer and permit the watch dog timer to "time-out" and, thereby, reset the system.

As one can readily appreciate, since the idle task can be executed only if no other task in the system is ready to execute, the fact that the flag was not set, i.e., that the idle task has not executed, assures that an infinite tight loop or an infinite inter-task loop has been detected.

Watch dog timers are timer circuits which are well known to those of ordinary skill in the art and one embodiment of a watch dog timer will be described below in connection with FIG. 4. For example, it is well known that a typical watch dog timer circuit can be a two-stage timer. Specifically, in a preferred embodiment of the present invention, if a first time-out period is exceeded, the watch dog timer produces a particular type of signal such as, for example, a non-maskable interrupt which may be used in conjunction with a 286 CPU which is available from Intel Corporation. Such a non-maskable interrupt may be used to trigger a first category of system recovery which is well known to those of ordinary skill in the art. Further, if a second time-out period is exceeded, which second time-out period is typically longer than the first time-out period, then the watch dog timer produces another type of signal. Such second type of signal may be used to trigger a second category of system recovery such as, for example and as is well known in the art, to initiate a power reset or power reboot of the system. Lastly, as is well known to those of ordinary skill in the art, the time-out period for the watch dog timer may be changed under system control.

Figure 4:
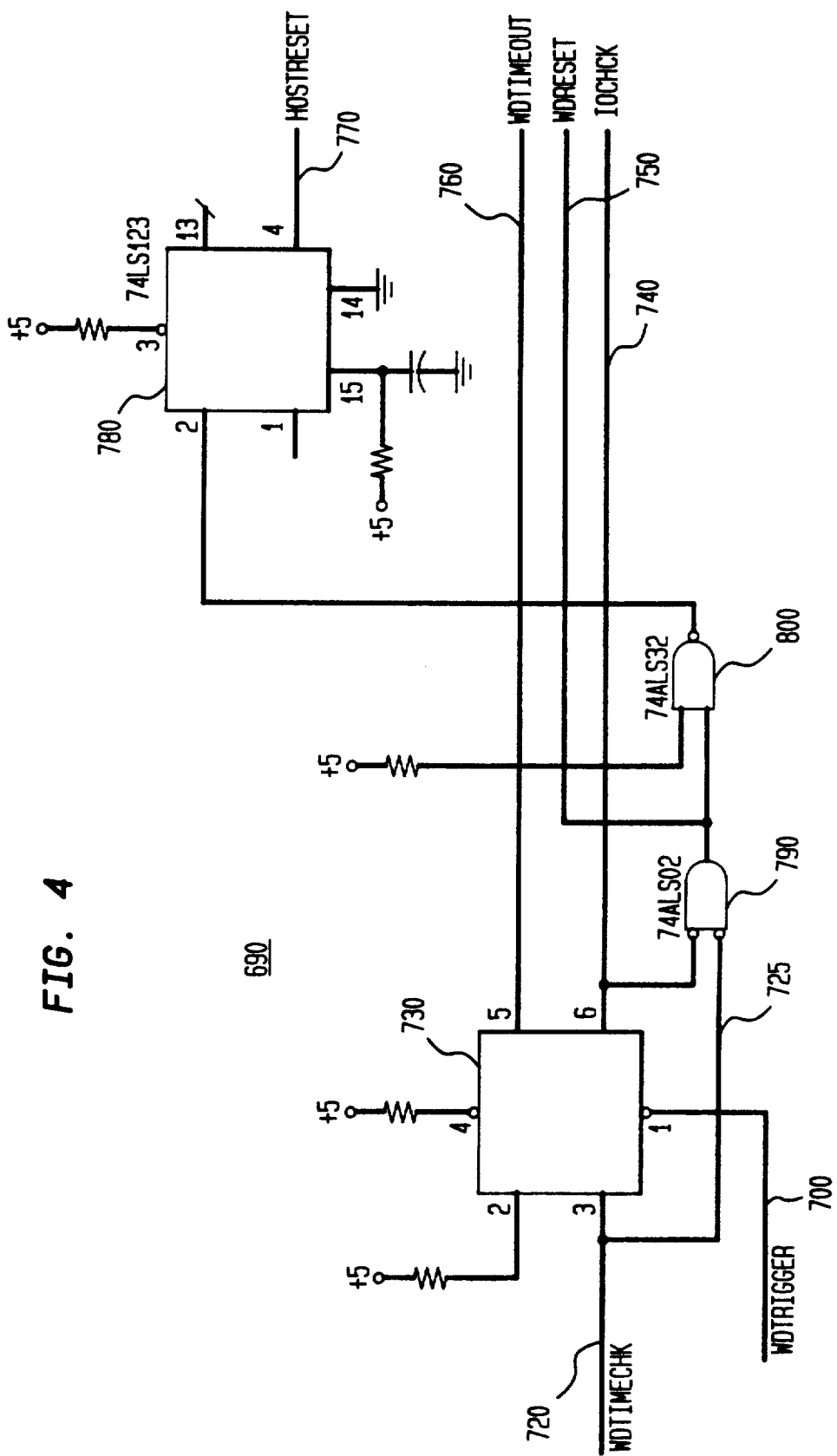
FIG. 4 is a block diagram of a watch dog timer which is used to fabricate embodiments of the present invention.

FIG. 4 shows watch timer circuit 690 which may be used in conjunction with the present invention. Watch dog timer 690 timer logic is made up of standard parts which are well known to those of ordinary skill in the art such as a flip-flop, a timer and several logic gates. Specifically, signal WDTRIGGER is generated by, for example, the system, and is applied as input to flip-flop 730 to "pat" watch dog timer circuit 690. Signal WDTIMECHK is generated by the system and is applied as input to flip-flop 730 over lead 720 and as input to logic gate 790 over lead 725. WDTIMECHK provides a programmable time out period for watch dog circuit 690.

Output signal IOCHCK is output from flip-flop 730 over lead 740 to provoke a non-maskable interrupt. Signal IOCHK is generated by flip-flop 730 when watch dog circuit 690 is not "patted" before the application of the timing signal WDTIMECHK. Further, output signal WDTIMEOUT from flip-flop 730 over lead 760 and output signal WDRESET from logic circuit 790 over lead 750 provide status information concerning the means by which watch dog timer circuit 690 timed out. In particular, in one embodiment, signals WDTIMEOUT and WDRESET are written to status registers which may be interrogated so that the system can track the reasons for a time-out.

In addition, when signal IOCHK is generated, timer 780 is activated. Then if watch dog circuit 690 does not receive a "pat" from signal WDTRIGGER before timer 780 expires, timer 780 generates signal HOSTRESET. Signal HOSTRESET which is output from timer 780 over lead 770 is a 2nd stage reset and may be used, for example, to provoke a cold reboot of the system.

As shown in FIG. 4, watch dog timer circuit 690 is comprised of flip-flop 730 which can be chip number 74ALS74, timer 780 which can be chip number 74LS123, and standard logic gates 790 and 800.

Figure 2:
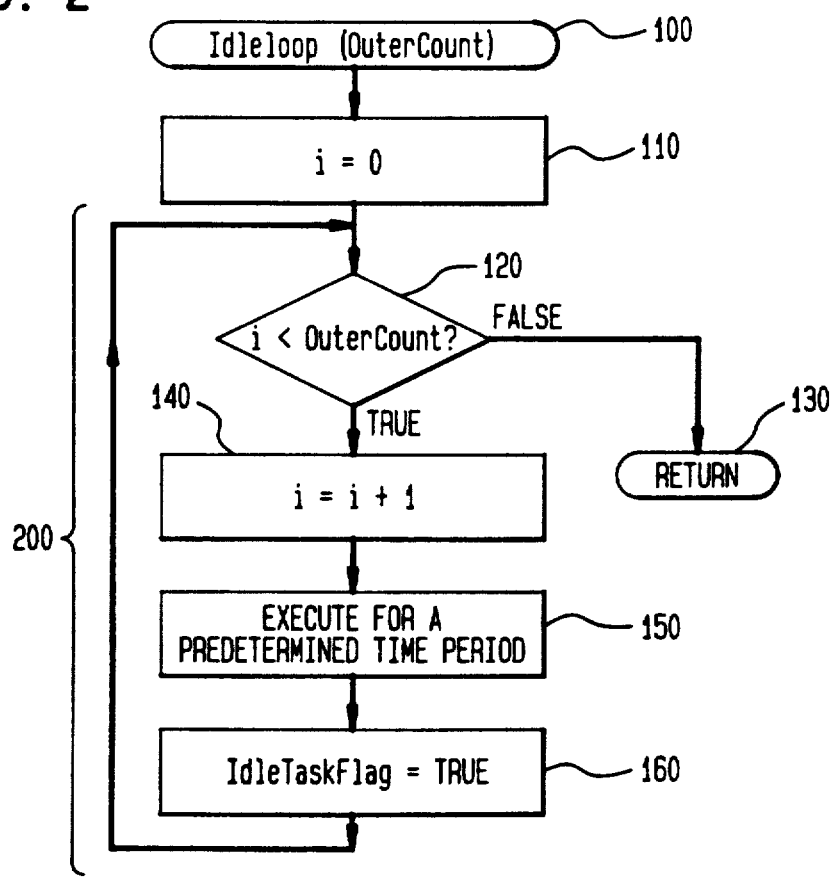
FIG. 2 is a flowchart of an idle task which is fabricated in accordance with the present invention.
Figure 3:
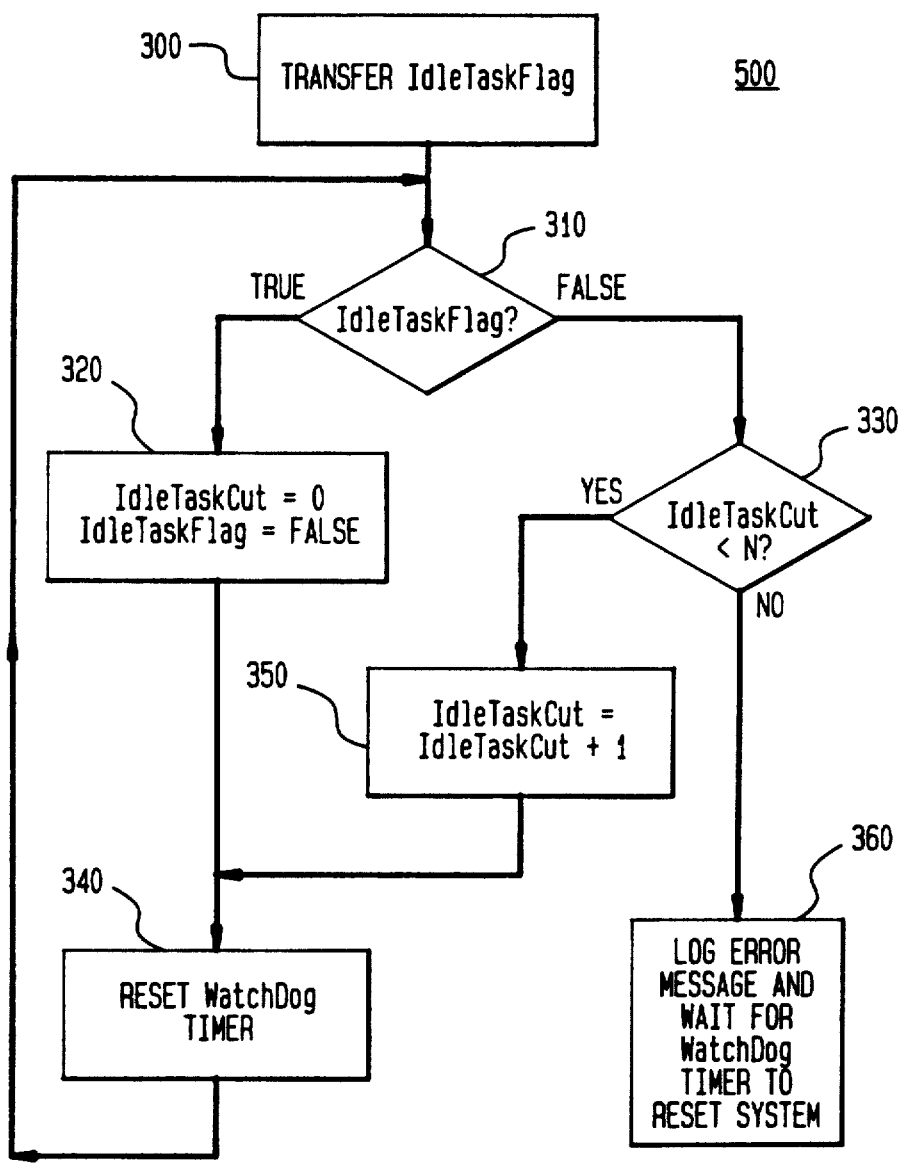
FIG. 3 is a flowchart of a watch dog task which is fabricated in accordance with the present invention.

A description of the preferred embodiment of the present invention is set forth in conjunction with FIGS. 2 and 3. Specifically, FIG. 2 is a flowchart of an idle task which is fabricated in accordance with the present invention. At box 100, the value of a counter, OuterCount, is transferred to the idle task. It is well known to those of ordinary skill in the art that the value of OuterCount may be set or reset by the operating system and it is well known to those of ordinary skill in the art as to how such a value is transferred to the idle task. At box 110, outer loop index i is set to 0 and control is transferred to loop 200. The following takes place within loop 200. At box 120 a determination is made as to whether outer loop index i is less than OuterCount. If outer loop index i is larger than or equal to OuterCount, control is transferred to box 130 wherein control is transferred back to the operating system. However, if outer loop index i is less than OuterCount, control is transferred to box 140. At box 140, outer loop index i is incremented by 1 and control is transferred to box 150. At box 150, the idle task executes instructions to use up a predetermined amount of time. For example, as one of ordinary skill in the art can appreciate, this can be accomplished by executing a predetermined number of instructions a predetermined number of times in a loop. Then, control is transferred to box 160.

At box 160, flag IdleTaskFlag is set to "true" and control is transferred to box 120 to continue the outer loop 200.

As one can readily appreciate from the above, the "two-tiered" structure described above with reference to FIG. 2 which uses outer loop 200 and box 150 to use up a predetermined amount of time is not required. However, this is preferred because one can use this "two-tiered" structure to cause certain types of messages to be generated after the first tier has been reached.

FIG. 3 is a flowchart of a watch dog task which is fabricated in accordance with the present invention. At box 300, flag IdleTaskFlag is transferred, in a manner which is well known to those of ordinary skill in the art, to the watch dog timer task which is comprised of loop 500. At box 310, a determination is made as to whether IdleTaskFlag is "true" or "false." If IdleTaskFlag is "true," control is transferred to box 320, whereas, if IdleTaskFlag is false, control is transferred to box 330.

If IdleTaskFlag is true, indicating that the idle task has run and set this flag, box 320 resets count IdleTaskCnt to 0 and resets IdleTaskFlag to "false." Control is then transferred to box 340. At box 340, a signal is generated which is sent to "pat" or "reset" the watch dog timer. In an alternative embodiment, another flag may be set which is read by the operating system for use in resetting the watch dog timer. Control is then transferred to the top of loop 500 at box 310.

However, if IdleTaskFlag is "false," at box 330, a determination is made as to whether IdleTaskCnt is less than a predetermined amount N. N is a predetermined time period which is relatively long with respect to the maximum time period that the system can consume 100% of the CPU time in a normally functioning system. If IdleTaskCnt is less than N, then control is transferred to box 350, whereas, if IdleTaskCnt is greater than or equal to N, control is transferred to box 360.

At box 350, IdleTaskCnt is incremented by an amount which represents a time period. For example, if, as shown in FIG. 3, IdleTaskCnt is incremented by 1, as should be clear to those of ordinary skill in the art, N is then a number which is properly normalized so that 1 represents a particular time period in terms, for example, of CPU instructions or some other equivalent. Control is transferred to box 340 to reset or "pat" the watch dog timer. As one can readily appreciate, this permits the idle task to be "skipped" for up to the predetermined time period before resetting the system as will be explained below.

At box 360, since IdleTaskCnt exceeds or equals N, this indicates that the idle task has not run as a result, for example, of an infinite loop in higher priority tasks. Thus, at box 360, an error message is logged. Further, at this point control is maintained at box 360 to await for the watch dog timer to trip and reset the system.

It should be clear to those of ordinary skill in the art that further embodiments of the present invention may be made without departing from its teachings. For example, instead of merely waiting for the watch dog timer to trip at box 360, the system may force the watch dog timer to reset the system or, in the embodiment shown in FIG. 3, control may be transferred to box 310 so that the task goes through a loop and, thereby, waits for the watch dog timer to trip and reset the system. Further, when the system resets, it can be reset in any one of a number of different modes which are well known to those of ordinary skill in the art, including, for example, a power reboot.

What is claimed is:

1. Method for utilizing a watch dog timer to detect infinite tight loops and infinite inter-task loops in application tasks having priorities of execution in a multitask, real-time computer system, said method comprising the steps of:

executing an idle software task in the computer system which has a first priority of execution, the first priority being lower than the priorities of execution of the application tasks, said idle task setting a flag in the computer system; and executing a watch dog software task in the computer system which has a second priority of execution, the second priority being higher than the priorities of execution of the application tasks and the first priority;

wherein the watch dog task examines the flag, if the watch dog task examination finds that the flag has been set, the watch dog task: (a) resets the flag, (b) resets a timing flag in the computer system, and (c) causes a signal to be generated, in response to the signal, the computer system resets the watch dog timer;

if the watch dog task examination finds that the flag has not been set the watch dog task examines the timing flag and (a) if the examination of the timing flag indicates a time measure which is less than a predetermined threshold, the watch dog task increments the timing flag by a predetermined amount and causes the signal to be generated, in response to the signal, the computer system resets the watch dog timer and (b) if the examination of the timing flag indicates a time measure which is greater than or equal to the predetermined threshold, the watch dog task causes a further signal to be generated, in response to the further signal, the computer system causes the watch dog timer to reset the system.

2. Method for utilizing a watch dog timer to detect infinite tight loops and infinite inter-task loops in application tasks having priorities of execution in a multi-task, real-time computer system, said method comprising the steps of:

executing an idle software task in the computer system which has a first priority of execution, the first priority being lower than the priorities of execution of the application tasks, said idle task setting a flag in the computer system; and executing a watch dog software task in the computer system which has a second priority of execution, the second priority being higher than the priorities of execution of the application tasks and the first priority;

wherein the watch dog task examines the flag, if the watch dog task examination finds that the flag has been set, the watch dog task: (a) resets the flag, (b) resets a timing flag in the computer system, and (c) causes a signal to be generated, in response to the signal, the computer system resets the watch dog timer;

if the watch dog task examination finds that the flag has not been set the watch dog task examines the timing flag and (a) if the examination of the timing flag indicates a time measure which is less than a predetermined threshold, the watch dog task increments the timing flag by a predetermined amount and causes the signal to be generated, in response to the signal, the computer system resets the watch dog timer and (b) if the examination of the timing flag indicates a time measure which is greater than or equal to the predetermined threshold, the watch dog tasks waits, thereby enabling the watch dog timer to reset the system.

3. Method for utilizing a watch dog timer to detect infinite tight loops and infinite inter-task loops in application tasks having priorities of execution in a multi-task, real-time computer system, said method comprising the steps of:

executing an idle software task in the computer system which has a first priority of execution, the first priority being lower than the priorities of execution of the application tasks, said idle task generating information to indicate that the idle task has executed; and executing a watch dog software task in the computer system which has a second priority of execution, the second priority being higher than the priorities of execution of the application tasks and the first priority;

wherein the watch dog task examines the information, if the watch dog task examination finds that the information indicates that the idle task has executed, the watch dog task: (a) resets the information to indicate that the idle task has not executed, (b) resets a timing flag in the computer system, and (c) generates further information, in response to the further information, the computer system resets the watch dog timer;

if the watch dog task examination finds that the information indicates that the idle task has not executed the watch dog task examines the timing flag and (a) if the examination of the timing flag indicates a time measure which is less than a predetermined threshold, the watch dog task increments the timing flag by a predetermined amount and generates the further information and (b) if the examination of the timing flag indicates a time measure which is greater than or equal to the predetermined threshold, the watch dog task causes still further information to be generated, in response to the still further information, the computer system causes the watch dog timer to reset the system.

4. Method for utilizing a watch dog timer to detect infinite tight loops and infinite inter-task loops in application tasks having priorities of execution in a multi-task, real-time computer system, said method comprising the steps of:

executing an idle software task in the computer system which has a first priority of execution, the first priority being lower than the priorities of execution of the application tasks, said idle task generating information to indicate that the idle task has executed; and executing a watch dog software task in the computer system which has a second priority of execution, the second priority being higher than the priorities of execution of the application tasks and the first priority;

wherein the watch dog task examines the information, if the watch dog task examination finds that the information indicates that the idle task has executed, the watch dog task: (a) resets the information to indicate that the idle task has not executed, (b) resets a timing flag in the computer system, and (c) generates further information, in response to the further information, the computer system resets the watch dog timer;

if the watch dog task examination finds that the information indicates that the idle task has not executed the watch dog task examines the timing flag and (a) if the examination of the timing flag indicates a time measure which is less than a predetermined threshold, the watch dog task increments the timing flag by a predetermined amount and generates the further information and (b) if the examination of the timing flag indicates a time measure which is greater than or equal to the predetermined threshold, the watch dog task waits, thereby enabling the watch dog timer to reset the system.

5. Apparatus for utilizing a watch dog timer to detect infinite tight loops and infinite inter-task loops in application tasks having priorities of execution in a multi-task, real-time computer system, said apparatus comprises:

idle task means for executing at a first priority and for setting a flag, the first priority being lower than the priorities of execution of the application tasks; and watch dog task means for executing at a second priority, the second priority being higher than the priorities of execution of the application tasks and the first priority;

wherein the watch dog task means examines the flag, if the watch dog task means examination finds that the flag has been set, the watch dog task means: (a) resets the flag, (b) resets a timer means, and (c) sends a signal to reset the watch dog timer;

if the watch dog task means examination finds that the flag has not been set the watch dog task means examines the timer means and (a) if the examination of the timer means indicates a time measure which is less than a predetermined threshold, the watch dog task means advances the timer means by a predetermined amount and sends a signal to reset the watch dog timer and (b) if the examination of the timer means indicates a time measure which is greater than or equal to the predetermined threshold, the watch dog task means sends a signal to the watch dog timer to reset the system.

6. Apparatus for utilizing a watch dog timer to detect infinite tight loops and infinite inter-task loops in application tasks having priorities of execution in a multitask, real-time computer system, said apparatus comprises:

idle task means for executing at a first priority and for setting a flag, the first priority being lower than the priorities of execution of the application tasks; and watch dog task means for executing at a second priority, the second priority being higher than the priorities of execution of the application tasks and the first priority;

wherein the watch dog task means examines the flag, if the watch dog task means examination finds that the flag has been set, the watch dog task means: (a) resets the flag, (b) resets a timer means, and (c) sends a signal to reset the watch dog timer;

if the watch dog task means examination finds that the flag has not been set the watch dog task means examines the timer means and (a) if the examination of the timer means indicates a time measure which is less than a predetermined threshold, the watch dog task means advances the timer means by a predetermined amount and sends a signal to reset the watch dog timer and (b) if the examination of the timer means indicates a time measure which is greater than or equal to the predetermined threshold, the watch dog task means waits, thereby enabling the watch dog timer to reset the system.

* * * * *